United States Patent
Robeson et al.

(10) Patent No.: US 9,498,825 B2
(45) Date of Patent: Nov. 22, 2016

(54) PIPE DE-BURRING ASSEMBLY

(71) Applicants: David Robeson, Loma Linda, CA (US); Bryston Robeson, Loma Linda, CA (US)

(72) Inventors: David Robeson, Loma Linda, CA (US); Bryston Robeson, Loma Linda, CA (US)

(*) Notice: Subject to any disclaimer, the term of this patent is extended or adjusted under 35 U.S.C. 154(b) by 0 days.

(21) Appl. No.: 14/641,645

(22) Filed: Mar. 9, 2015

(65) Prior Publication Data

US 2016/0263658 A1   Sep. 15, 2016

(51) Int. Cl.

| B24B 9/00 | (2006.01) |
|---|---|
| B23B 5/16 | (2006.01) |
| B23B 51/00 | (2006.01) |
| B08B 9/02 | (2006.01) |
| B08B 9/023 | (2006.01) |
| B08B 9/027 | (2006.01) |

(52) U.S. Cl.
CPC .............. *B23B 5/167* (2013.01); *B08B 9/021* (2013.01); *B23B 2215/72* (2013.01); *B23B 2220/08* (2013.01); *B23B 2251/24* (2013.01); *B24B 9/007* (2013.01)

(58) Field of Classification Search
CPC ........... B23B 51/00; B23B 5/16; B23B 5/167; B08B 9/02; B08B 9/021; B08B 9/023; B08B 9/027; B08B 9/043; B08B 9/045; B24B 9/00; B24B 9/007

USPC ........ 451/462, 541, 545; 408/188, 211, 227; 15/104.03, 104.04, 104.05, 104.09, 15/104.095

See application file for complete search history.

(56) References Cited

U.S. PATENT DOCUMENTS

| 1,228,951 | A | * | 6/1917 | Morton | B23B 51/00 15/105 |
|---|---|---|---|---|---|
| 2,242,821 | A | * | 5/1941 | Fanslow | B23B 5/167 408/211 |
| 2,629,121 | A | * | 2/1953 | Petre | B08B 9/023 15/104.03 |
| 3,168,799 | A | * | 2/1965 | Johnson | B24D 15/02 15/105 |
| 3,232,145 | A | * | 2/1966 | Wilson | B23B 5/167 144/205 |
| 3,754,832 | A | * | 8/1973 | Stickler | B23B 5/167 408/207 |
| 3,870,432 | A | * | 3/1975 | Strybel | B23B 5/168 408/191 |
| 4,229,129 | A | * | 10/1980 | Schaenzer | B23B 5/167 408/211 |
| 4,676,703 | A |   | 6/1987 | Swanson |   |
| 4,678,380 | A | * | 7/1987 | Zahuranec | B23B 5/167 407/33 |
| D301,540 | S | * | 6/1989 | Zahuranec | D8/14 |
| 4,860,453 | A | * | 8/1989 | Carroll | F42B 33/10 15/104.095 |
| 5,363,530 | A | * | 11/1994 | Dunn | B08B 9/021 15/104.03 |

(Continued)

*Primary Examiner* — Eileen Morgan

(57) ABSTRACT

A pipe de-burring assembly includes a mount that may be coupled to a power tool such that the power tool rotates the mount when the power tool is turned on. A de-burring member is movably coupled to the mount. The de-burring member may remove burrs from either of an inside surface or an outside surface of a pipe.

5 Claims, 6 Drawing Sheets

(56) References Cited

U.S. PATENT DOCUMENTS

| | | | | |
|---|---|---|---|---|
| 6,423,078 B1* | 7/2002 | Bays | ............... | A61B 17/32 |
| | | | | 606/131 |
| 6,578,228 B2* | 6/2003 | Yehia | ............... | B08B 9/021 |
| | | | | 15/104.04 |
| 6,704,964 B2* | 3/2004 | Knowles | ............... | A46B 13/001 |
| | | | | 15/104.04 |
| 6,757,929 B1* | 7/2004 | Snelson | ............... | B08B 9/021 |
| | | | | 15/104.05 |
| 6,964,077 B2* | 11/2005 | Kadinger | ............... | B08B 9/021 |
| | | | | 15/104.03 |
| D521,241 S | 5/2006 | Dimmerling | | |
| 7,124,882 B1 | 10/2006 | Jadydy | | |
| 7,237,987 B2 | 7/2007 | Hernandez, Jr. et al. | | |
| 7,651,303 B2* | 1/2010 | Zick | ............... | B23B 5/167 |
| | | | | 408/211 |
| D637,466 S * | 5/2011 | Singleton | ............... | D8/41 |
| 8,101,026 B1 | 1/2012 | Brooks | | |
| 2004/0200018 A1* | 10/2004 | Kadinger | ............... | B08B 9/021 |
| | | | | 15/104.04 |
| 2009/0209178 A1* | 8/2009 | Vargas | ............... | B08B 9/021 |
| | | | | 451/51 |
| 2010/0122423 A1* | 5/2010 | Lozar | ............... | B08B 9/021 |
| | | | | 15/104.04 |
| 2013/0025509 A1* | 1/2013 | Jin | ............... | A47B 3/087 |
| | | | | 108/166 |

* cited by examiner

PIPE DE-BURRING ASSEMBLY

BACKGROUND OF THE DISCLOSURE

Field of the Disclosure

The disclosure relates to de-burring devices and more particularly pertains to a new de-burring device for removing burrs from either of an inside surface or an outside surface of a pipe.

SUMMARY OF THE DISCLOSURE

An embodiment of the disclosure meets the needs presented above by generally comprising a mount that may be coupled to a power tool such that the power tool rotates the mount when the power tool is turned on. A de-burring member is movably coupled to the mount. The de-burring member may remove burrs from either of an inside surface or an outside surface of a pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
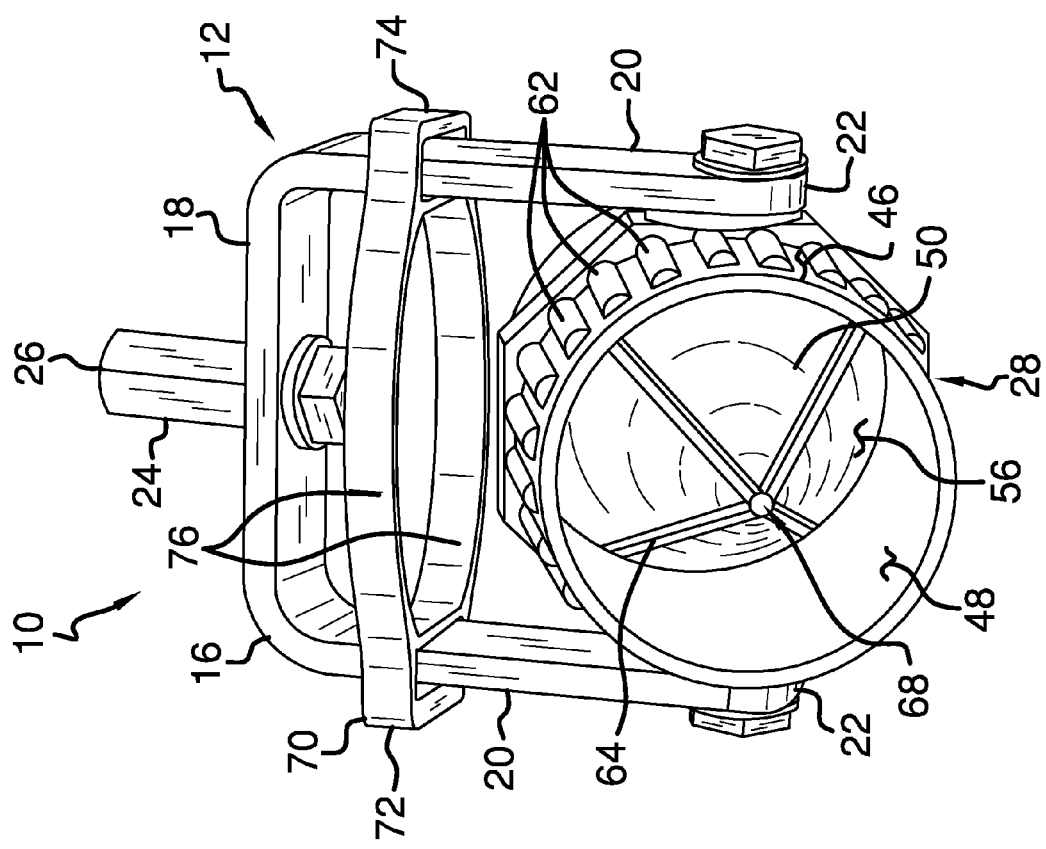
FIG. 1 is a perspective view of a pipe de-burring assembly according to an embodiment of the disclosure.
Figure 2:
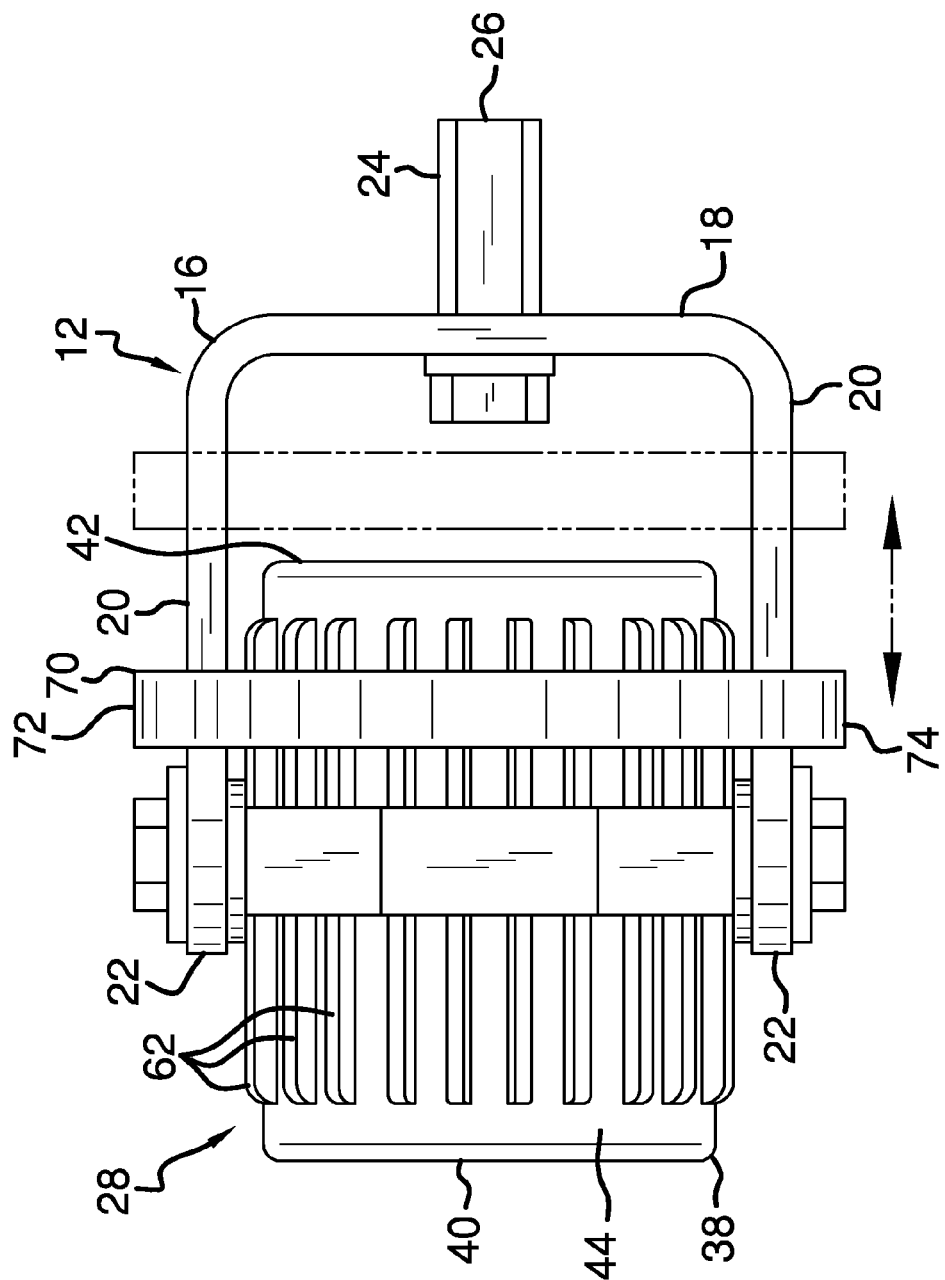
FIG. 2 is a top view of an embodiment of the disclosure.
Figure 3:
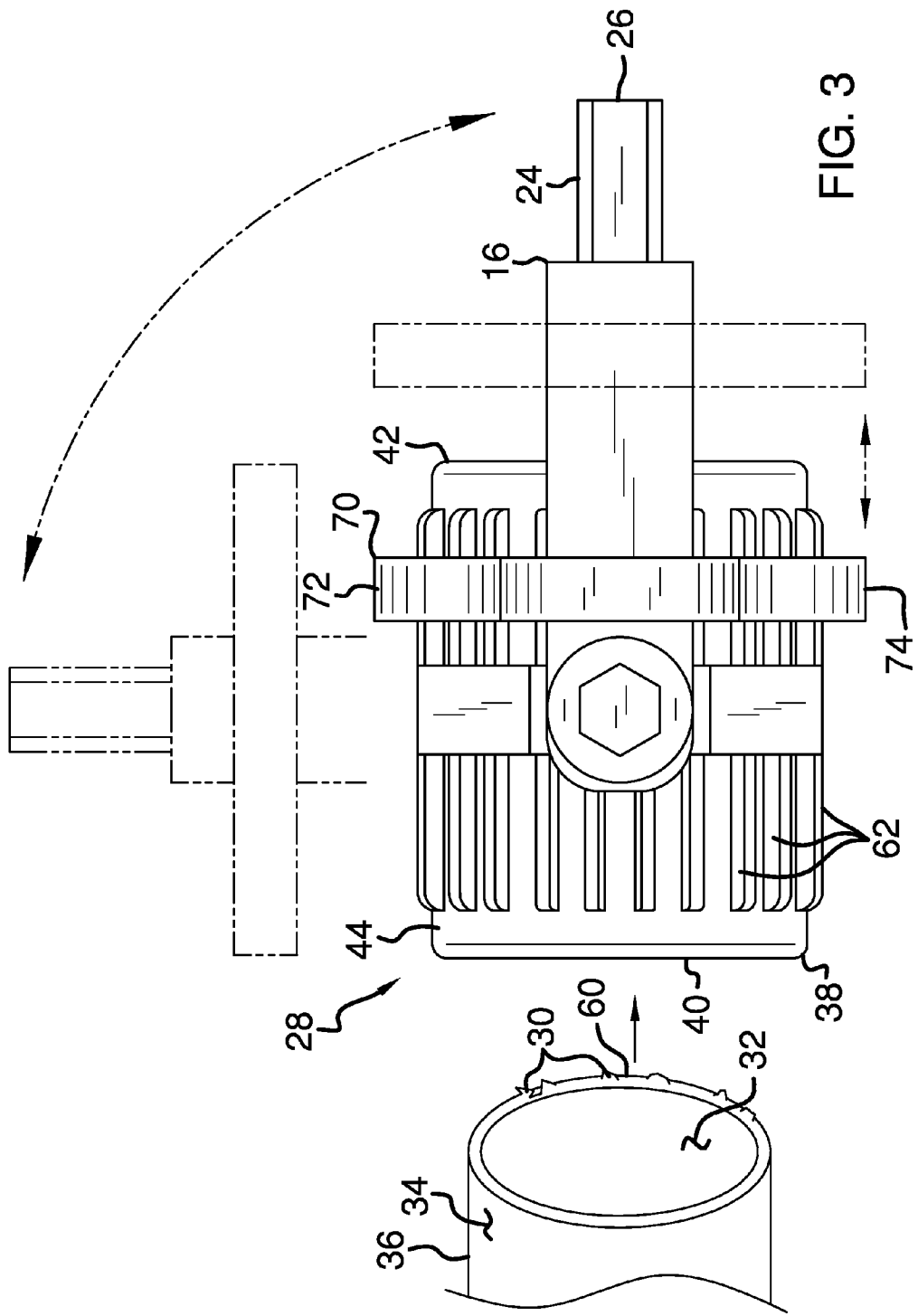
FIG. 3 is a right side view of an embodiment of the disclosure.
Figure 4:
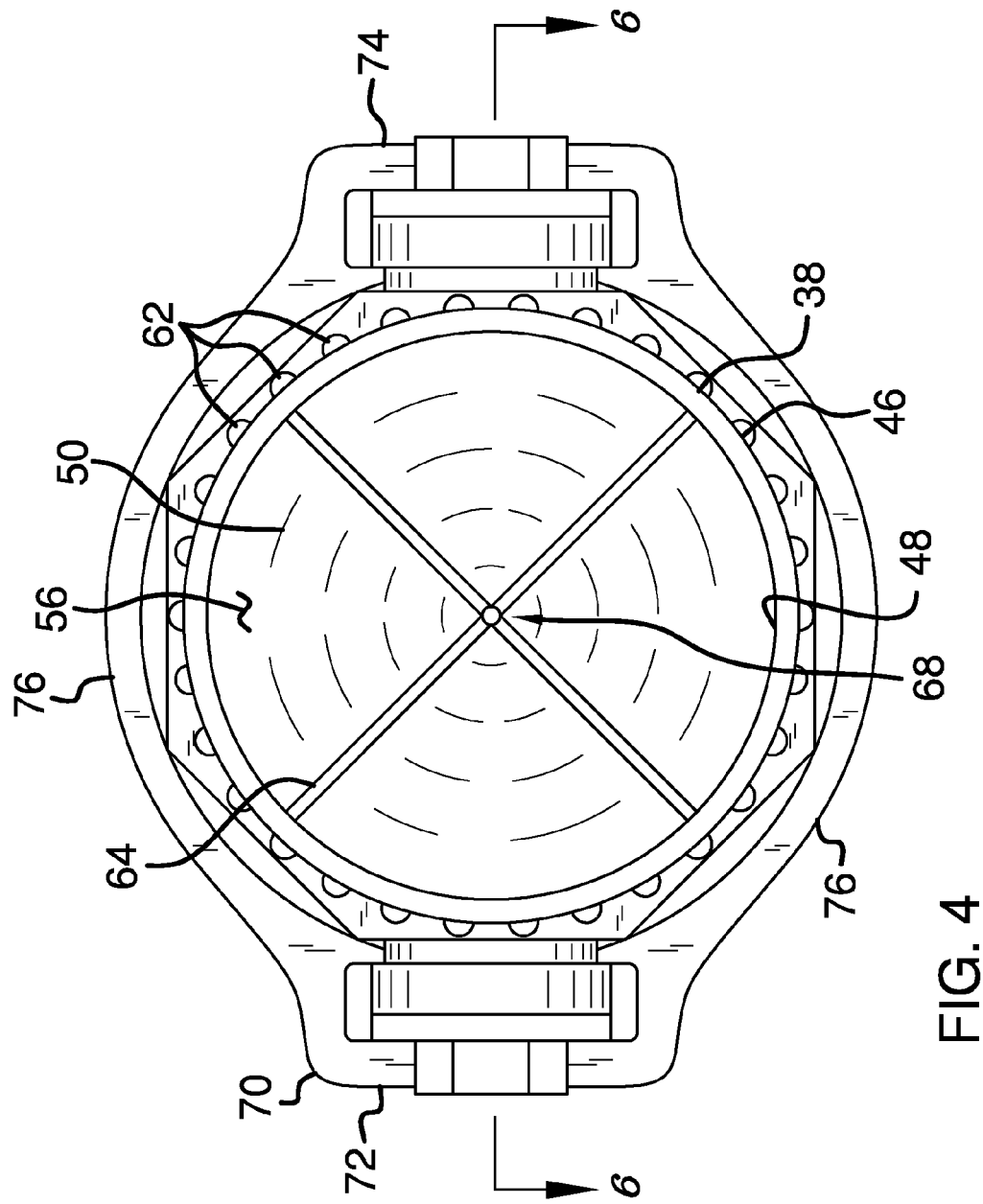
FIG. 4 is a front view of an embodiment of the disclosure.
Figure 5:
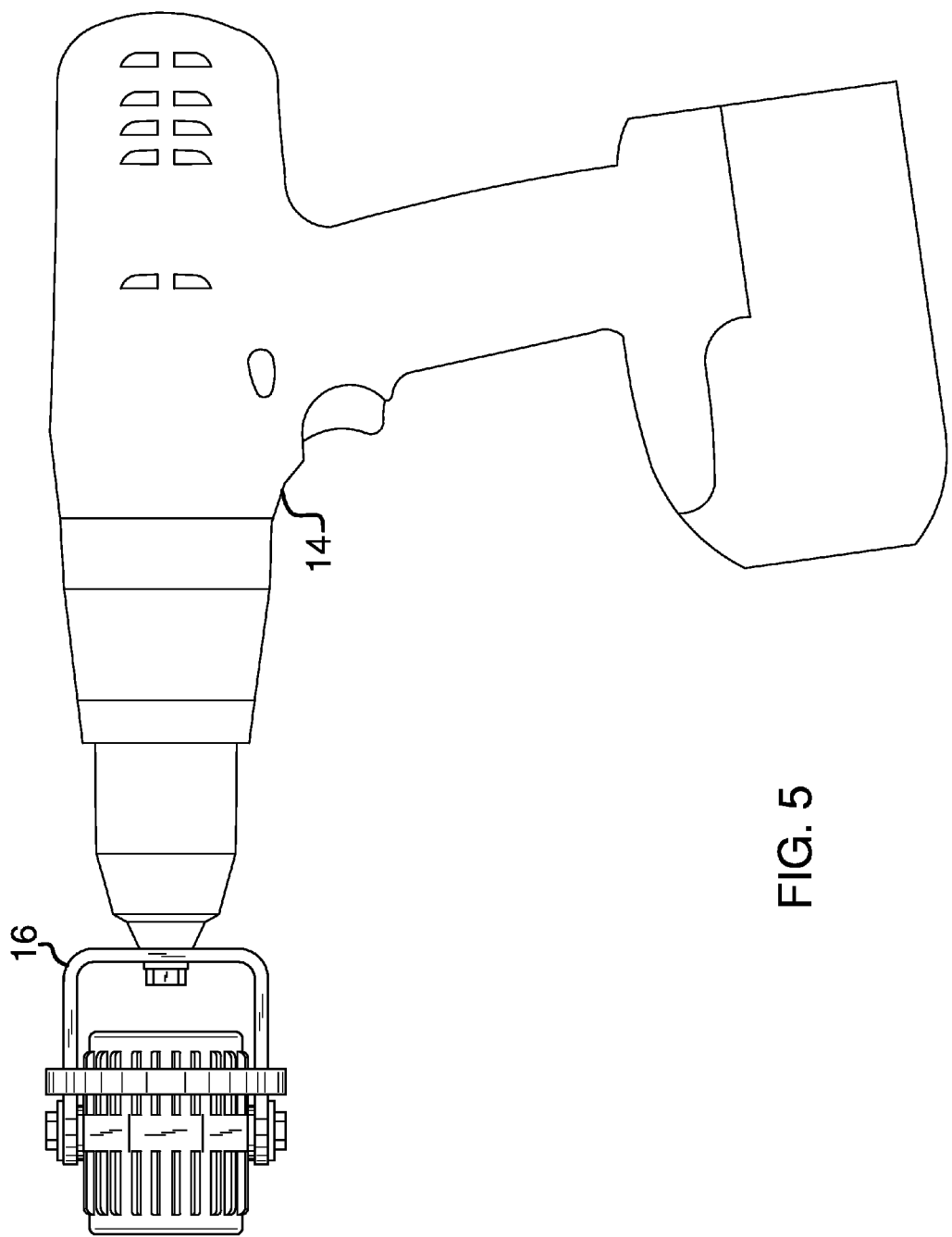
FIG. 5 is a perspective in-use view of an embodiment of the disclosure.
Figure 6:
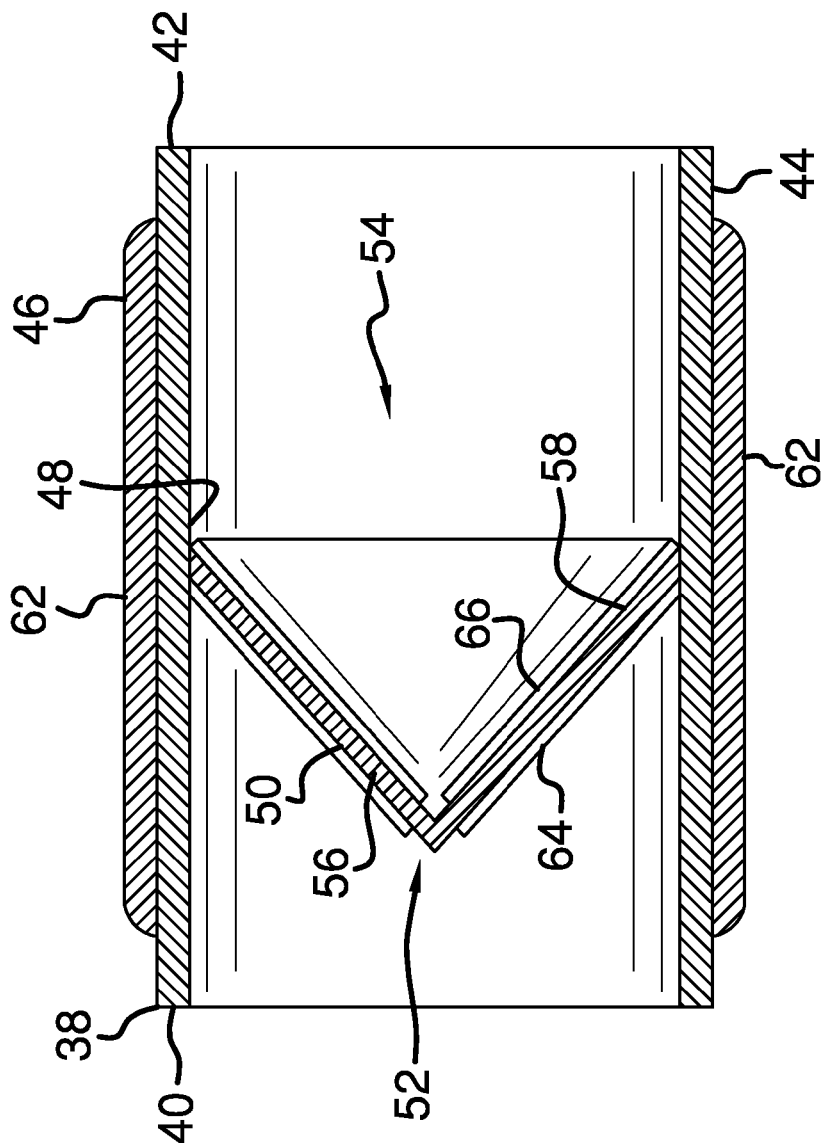
FIG. 6 is a cross sectional view taken along line 6-6 of FIG. 4 of an embodiment of the disclosure.

With reference now to the drawings, and in particular to FIGS. 1 through 6 thereof, a new de-burring device embodying the principles and concepts of an embodiment of the disclosure and generally designated by the reference numeral 10 will be described.

As best illustrated in FIGS. 1 through 6, the pipe de-burring assembly 10 generally comprises a mount 12 that may be coupled to a power tool 14 such that the power tool 14 rotates the mount 12 when the power tool 14 is turned on. The power tool 14 may be a hand held drill or the like. The mount 12 comprises a swivel 16 that has a central arm 18 and a pair of lateral arms 20 coupled to and extending away from the central arm 18. The lateral arms 20 are spaced apart from each other such that the swivel 16 is U-shaped and each of the lateral arms 20 has a distal end 22 with respect to the central arm 18. A shaft 24 is coupled to the central arm 18 and the shaft 24 has a distal end 26 with respect to the central arm 18. The shaft 24 is centrally positioned on the central arm 18 and the distal end 26 of the shaft 24 may be coupled to the power tool 14. The swivel 16 is rotated about an axis extending through the distal end 26 of the shaft 24 and the central arm 18 when the power tool 14 is turned on.

A de-burring member 28 is movably coupled to the mount 12. The de-burring member 28 may remove burrs 30 from either of an inside surface 32 or an outside surface 34 of a pipe 36. The pipe 36 may be comprised of a rigid material comprising copper, steel or the like. The pipe 36 may additionally be comprised of comprise stainless steel tubing. The de-burring member 28 comprises a cylinder 38 that has a first end 40, a second end 42 and an outer wall 44 extending therebetween. Each of the first end 40 and the second end 42 is open and the outer wall 44 has an outer surface 46 and an inner surface 48.

The cylinder 38 has a dividing wall 50 coupled to the inner surface 48 of the outer wall 44 and the dividing wall 50 is centrally positioned within the cylinder 38 to define a first portion 52 and a second portion 54 of an interior of the cylinder 38. The dividing wall 50 has a first surface 56 and a second surface 58 and the dividing wall 50 tapers outwardly toward the first end 40 such that the dividing wall 50 has a conical shape. The outer wall 44 of the cylinder 38 is rotatably coupled between the distal ends 22 of each of the lateral arms 20. Moreover, the cylinder 38 is positionable in a cutting position such that an axis extending through the first end 40 and the second end 42 is aligned with the axis extending through the distal end 26 of the shaft 24 and the central arm 18. The cylinder 38 rotates about the axis extending through the distal end 26 and the central arm 18 when the power tool 14 is turned on.

The cylinder 38 is positioned in a first cutting position having the first end 40 being directed away from the central arm 18. The first portion 52 of the interior may insertably receive an end 60 of the pipe 36 such that the first surface 56 abuts the inside surface 32 of the pipe 36 adjacent to the end 60 of the pipe 36. The cylinder 38 is positioned in a second cutting position having the second end 42 being directed away from the central arm 18. The second portion 54 of the interior may insertably receive the end 60 of the pipe 36 such that the second surface 58 abuts the outside surface 34 of the pipe 36 adjacent to the end 60 of the pipe 36. The cylinder 38 may have a diameter generally between 2 inches and 4 inches such that the cylinder 38 may accommodate a variety of sizes of pipes 36. The outer surface 46 of the outer wall 44 may a plurality of ridges 62 extending outwardly therefrom. The ridges 62 may extend between the first 40 and second 42 ends and the ridges 62 may be spaced apart from each other. The ridges 62 may be gripped.

A first blade 64 and a second blade 66 are provided. The first blade 64 is coupled to the first surface 56 of the dividing wall 50 and the first blade 64 extends between the inner surface 48 of the outer wall 44 and a center 68 of the dividing wall 50. The first blade 64 frictionally engages the inside surface 32 of the pipe 36 such that the first blade 64 abrades the burrs 30 from the pipe 36 when the power tool 14 is turned on. The second blade 66 is coupled to the second surface 58 of the dividing wall 50 and the second blade 66 extends between the inner surface 48 of the outer wall 44 and the center 68 of the dividing wall 50. The second blade 66 frictionally engages the outside surface 34 of the pipe 36 such that the second blade 66 abrades the burrs 30 from the pipe 36 when the power tool 14 is turned on. Each of the first 64 and second 66 blades may be one of a plurality of first 64 and second 66 blades. The first blades 64 may be spaced apart from each other and distributed on the first surface 56. The second blades 66 may be spaced apart from each other and distributed on the second surface 58.

A lock 70 is provided that has a first end 72 and a second end 74. The lock 70 has a pair of arms 76 extending between the first end 72 and the second end 74 and the arms 76 are spaced from each other. The first end 72 is slidably coupled to one of the lateral arms 20 and the second end 74 is slidably coupled to one of the lateral arms 20. The lock 70 is positioned in a locking position having the outer wall 44 of the cylinder 38 being restrained between the arms 76 such that the cylinder 38 is retained in the cutting position. The lock 70 is positioned in a releasing position having the lock 70 being spaced from the cylinder 38 such that the cylinder 38 is freely rotatable between the lateral arms 20.

In use, the shaft 24 is coupled to the power tool 14. The lock 70 is positioned in the releasing position and the cylinder 38 is positioned in the first cutting position to de-burr the inside surface 32 of the pipe 36. The lock 70 is positioned in the locking position to retain the cylinder 38 in the first cutting position. The pipe 36 is inserted into the first portion 52 of the interior of the cylinder 38 until the pipe 36 abuts the first blade 64. The power tool 14 is turned on so the first blade 64 abrades the burrs 30 from the inside surface 32 of the pipe 36.

The pipe 36 is removed from the first portion 52 of the interior of the cylinder 38. The lock 70 is positioned in the releasing position and the cylinder 38 is positioned in the second cutting position. The lock 70 is positioned in the locking position to retain the cylinder 38 in the second cutting position. The pipe 36 is inserted into the second portion 54 of the interior of the cylinder 38 until the pipe 36 abuts the second blade 66. The power tool 14 is turned on so the second blade 66 abrades the burrs 36 from the outside surface 34 of the pipe 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A pipe de-burring assembly configured to remove burrs from an outer surface and an inner surface of a pipe, said assembly comprising:

a mount configured to be coupled to a power tool such that said power tool rotates said mount when said power tool is turned on; and a de-burring member movably coupled to said mount, said de-burring member being configured to remove burrs from either of an inside surface or an outside surface of a pipe, wherein said de-burring member comprises a cylinder having a first end, a second end and an outer wall extending therebetween, each of said first end and said second end being open, said outer wall having an outer surface and an inner surface, said cylinder having a dividing wall coupled to said inner surface, said dividing wall being centrally positioned within said cylinder to define a first portion and a second portion of an interior of said cylinder, said dividing wall having a first surface and a second surface, said dividing wall tapering outwardly toward said first end such that said dividing wall has a conical shape;

said mount including a pair of lateral arms, a central arm and a shaft, said shaft having a distal end, each of said lateral arms having a distal end; and said outer wall of said cylinder being rotatably coupled between said distal ends of each of said lateral arms, said cylinder being positionable in a cutting position such that an axis extending through said first end and said second end is aligned with the axis extending through said distal end of said shaft and said central arm, said cylinder being configured to rotate about the axis extending through said distal end and said central arm when the power tool is turned on;

said cylinder being positioned in a first cutting position having said first end being directed away from said central arm, said first portion of said interior being configured to insertably receive an end of the pipe such that said first surface abuts the inside surface of the pipe, said cylinder being positioned in a second cutting position having said second end being directed away from said central arm, said second portion of said interior being configured to insertably receive the end of the pipe such that said second surface abuts the outside surface of the pipe;

a first blade and a second blade, said first blade being coupled to said first surface of said dividing wall, said first blade extending between said inner surface of said outer wall and a center of said dividing wall, said first blade being configured to frictionally engage the inside surface of the pipe such that said first blade abrades the burrs from the pipe when the power tool is turned on, said second blade being coupled to said second surface of said dividing wall, said second blade extending between said inner surface of said outer wall and said center of said dividing wall, said second blade being configured to frictionally engage the outside surface of the pipe such that said second blade abrades the burrs from the pipe when the power tool is turned on; and a lock having a first end and a second end, said lock having a pair of arms extending between said first end and said second end, said arms being spaced from each other, said first end being slidably coupled to one of said lateral arms and said second end being slidably coupled to one of said lateral arms.

2. The assembly according to claim 1, wherein said mount comprises a swivel having a central arm and a pair of lateral arms coupled to and extending away from said central arm, said lateral arms being spaced apart from each other such that said swivel is U-shaped, each of said lateral arms having a distal end with respect to said central arm.

3. The assembly according to claim 2, further comprising a shaft coupled to said central arm, said shaft having a distal end with respect to said central arm, said shaft being centrally positioned on said central arm, said distal end being configured to be coupled to the power tool, said swivel being rotated about an axis extending through said distal end of said shaft and said central arm when the power tool is turned on.

4. The assembly according to claim 1, wherein said lock is positioned in a locking position having said outer wall of said cylinder restrained between said arms such that said cylinder is retained in said cutting position, said lock being positioned in a releasing position having said lock being spaced from said cylinder such that said cylinder is freely rotatable between said lateral arms.

5. A pipe de-burring assembly configured to remove burrs from an outer surface and an inner surface of a pipe, said assembly comprising:
   a mount configured to be coupled to a power tool such that said power tool rotates said mount when said power tool is turned on, said mount comprising:
      a swivel having a central arm and a pair of lateral arms coupled to and extending away from said central arm, said lateral arms being spaced apart from each other such that said swivel is U-shaped, each of said lateral arms having a distal end with respect to said central arm; and
      a shaft coupled to said central arm, said shaft having a distal end with respect to said central arm, said shaft being centrally positioned on said central arm, said distal end being configured to be coupled to the power tool, said swivel being rotated about an axis extending through said distal end of said shaft and said central arm when the power tool is turned on;
   a de-burring member movably coupled to said mount, said de-burring member being configured to remove burrs from either of an inside surface or an outside surface of a pipe, said de-burring member comprising:
      a cylinder having a first end, a second end and an outer wall extending therebetween, each of said first end and said second end being open, said outer wall having an outer surface and an inner surface, said cylinder having a dividing wall coupled to said inner surface, said dividing wall being centrally positioned within said cylinder to define a first portion and a second portion of an interior of said cylinder, said dividing wall having a first surface and a second surface, said dividing wall tapering outwardly toward said first end such that said dividing wall has a conical shape, said outer wall of said cylinder being rotatably coupled between said distal ends of each of said lateral arms, said cylinder being positionable in a cutting position such that an axis extending through said first end and said second end is aligned with the axis extending through said distal end of said shaft and said central arm, said cylinder being configured to rotate about the axis extending through said distal end and said central arm when the power tool is turned on, said cylinder being positioned in a first cutting position having said first end being directed away from said central arm, said first portion of said interior being configured to insertably receive an end of the pipe such that said first surface abuts the inside surface of the pipe, said cylinder being positioned in a second cutting position having said second end being directed away from said central arm, said second portion of said interior being configured to insertably receive the end of the pipe such that said second surface abuts the outside surface of the pipe;
   a first blade and a second blade, said first blade being coupled to said first surface of said dividing wall, said first blade extending between said inner surface of said outer wall and a center of said dividing wall, said first blade being configured to frictionally engage the inside surface of the pipe such that said first blade abrades the burrs from the pipe when the power tool is turned on, said second blade being coupled to said second surface of said dividing wall, said second blade extending between said inner surface of said outer wall and said center of said dividing wall, said second blade being configured to frictionally engage the outside surface of the pipe such that said second blade abrades the burrs from the pipe when the power tool is turned on; and
   a lock having a first end and a second end, said lock having a pair of arms extending between said first end and said second end, said arms being spaced from each other, said first end being slidably coupled to one of said lateral arms and said second end being slidably coupled to one of said lateral arms, said lock being positioned in a locking position having said outer wall of said cylinder restrained between said arms such that said cylinder is retained in said cutting position, said lock being positioned in a releasing position having said lock being spaced from said cylinder such that said cylinder is freely rotatable between said lateral arms.

* * * * *